United States Patent [19]
Rose

[11] Patent Number: 5,452,688
[45] Date of Patent: Sep. 26, 1995

[54] METHOD AND APPARATUS FOR ENHANCING COMBUSTION IN INTERNAL COMBUSTION ENGINES

[76] Inventor: Hugh W. Rose, 4126 E. Minnezona, Phoenix, Ariz. 85018

[21] Appl. No.: 364,668

[22] Filed: Dec. 27, 1994

[51] Int. Cl.$^6$ .................................................. F02B 43/08
[52] U.S. Cl. ........................................ 123/3; 123/DIG. 12
[58] Field of Search ..................... 123/3, 1 A, DIG. 12; 204/129, 278; 323/355; 363/26

[56] References Cited

U.S. PATENT DOCUMENTS

| | | | |
|---|---|---|---|
| 3,311,097 | 3/1967 | Mittelstaedt | 123/119 |
| 3,648,668 | 3/1972 | Pacheco | 123/3 |
| 3,939,806 | 2/1976 | Bradley | 123/3 |
| 3,980,053 | 9/1976 | Horvath | 123/3 |
| 4,003,345 | 1/1977 | Bradley | 123/DIG. 12 |
| 4,023,545 | 5/1977 | Mosher et al. | 123/3 |
| 4,107,008 | 8/1978 | Horvath | 204/129 |
| 4,111,160 | 9/1978 | Talenti | 123/DIG. 12 |
| 4,246,080 | 1/1981 | Shinn | 123/DIG. 12 |
| 4,271,793 | 6/1981 | Valdespino | 123/1 A |
| 4,339,324 | 7/1982 | Haas | 204/270 |
| 4,488,090 | 12/1984 | Hancock | 315/201 |
| 4,763,610 | 8/1988 | Thomas | 123/3 |
| 5,105,773 | 4/1992 | Cunningham et al. | 123/3 |
| 5,119,768 | 6/1992 | Russell | 123/3 |
| 5,140,513 | 8/1992 | Yokoyama | 363/26 |
| 5,231,954 | 8/1993 | Stowe | 123/3 |
| 5,305,715 | 4/1994 | Nissley | 123/DIG. 12 |

*Primary Examiner*—Henry C. Yuen
*Assistant Examiner*—Erick Solis
*Attorney, Agent, or Firm*—Warren F. B. Lindsley

[57] ABSTRACT

A method and apparatus is disclosed for enhancing the combustion efficiency of an internal combustion engine having one or more combustion chambers. The apparatus comprises an electrical power source having a voltage output, a power supply in electrical communication with output of the electrical power source, and an electrolytic cell having a cathode and an anode immersed in an aqueous electrolytic solution. The anode and the cathode are in electrical communication with the power supply output. The power supply optimizes the voltage output of the power source for use with the electrolytic cell. In turn, the electrolytic cell breaks down the aqueous solution into a mixture of hydrogen and oxygen gases which is conveyed to the combustion chamber of the engine.

13 Claims, 2 Drawing Sheets

METHOD AND APPARATUS FOR ENHANCING COMBUSTION IN INTERNAL COMBUSTION ENGINES

BACKGROUND OF THE INVENTION

This invention relates to the use of electrolytic cells which generate a gaseous mixture of hydrogen and oxygen to enhance the efficient burning of hydrocarbon fuels in internal combustion engines, and more particularly, to the use of a power supply to provide optimum voltages to an electrolytic cell in an internal combustion engine.

Internal combustion engines are known to generate pollutants because of the incomplete burning of hydrocarbon fuels for power. A number of attempts have been made to increase the efficiency of the combustion of hydrocarbon fuel through the use of additives, in particular, hydrogen and oxygen generated from electrolytic cells and subsequently introduced into the engine combustion chambers.

The systems proposed in the past have not achieved public acceptance because of excessive weight, the danger of excessive heat generated by the units, the need for rigid control of the concentrations of electrolyte in the electrolytic solution and freezing of the solutions which is encountered when low concentrations of electrolytic solutions are used. In addition, the electrical power available with such engines, typically 12 to 14 volt batteries or alternators, does not provide the optimum voltage for use with an electrolytic cell.

DESCRIPTION OF THE PRIOR ART

Heretofore a number of patents have been directed to the use of electrolytically generated hydrogen and oxygen to enhance the combustion efficiency of internal combustion engines.

U.S. Pat. No. 3,311,097 entitled "Hydrogen-Oxygen Device in Combustion Engines" discloses the use of an electrolytic cell to generate hydrogen and oxygen for subsequent enhancement of the combustion efficiency of an internal combustion engine.

U.S. Pat. No. 4,339,324 entitled "Polycell Gas Generator" discloses a multiplicity of electrolytic cells arranged in a stacked plate configuration that affords a high degree of portability.

U.S. Pat. No. 4,488,090 entitled "Advertising Sign System" describes a low voltage system for supplying power to high voltage neon lights.

U.S. Pat. No. 5,105,773 entitled "Method and Apparatus for Enhancing Combustion in an Internal Combustion Engine through Electrolysis" discloses a electrolytic cell comprising a plurality of anodes and cathodes for careful control of the electrolytic output.

U.S. Pat. No. 5,231,954 entitled "Hydrogen/Oxygen Fuel Cell" discloses a fuel cell having a friction fitted top cap to mitigate the danger of an explosion.

The known prior art is described above. None of this prior art disclose the device set forth herein.

SUMMARY OF THE INVENTION

It is an object of this invention to provide an improved electrolytic cell system which overcomes the disadvantages of the previously known systems.

It is a further object of this invention to provide an optimum voltage to an electrolytic cell for use with internal combustion engines.

It is still another object of this invention to provide an improved low voltage, low weight electrolytic cell for use in combination with internal combustion engines.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
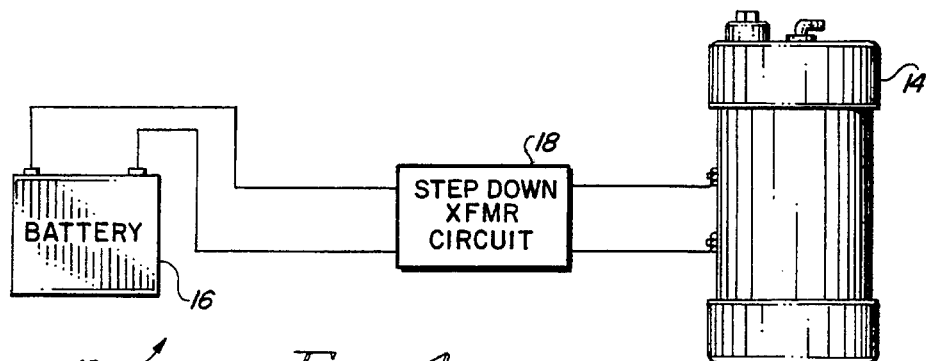
FIG. 1 is a schematic view of the present invention.

Referring more particularly to the drawings by characters of reference, FIGS. 1–4 disclose a system 10 for providing hydrogen and oxygen to an internal combustion engine 12 comprising an electrolytic cell 14, a power source 16 and a step down power supply circuit 18. In an automobile, power source 16 is a battery or an alternator having about a 12 volt/5 ampere DC output.

Figure 2:
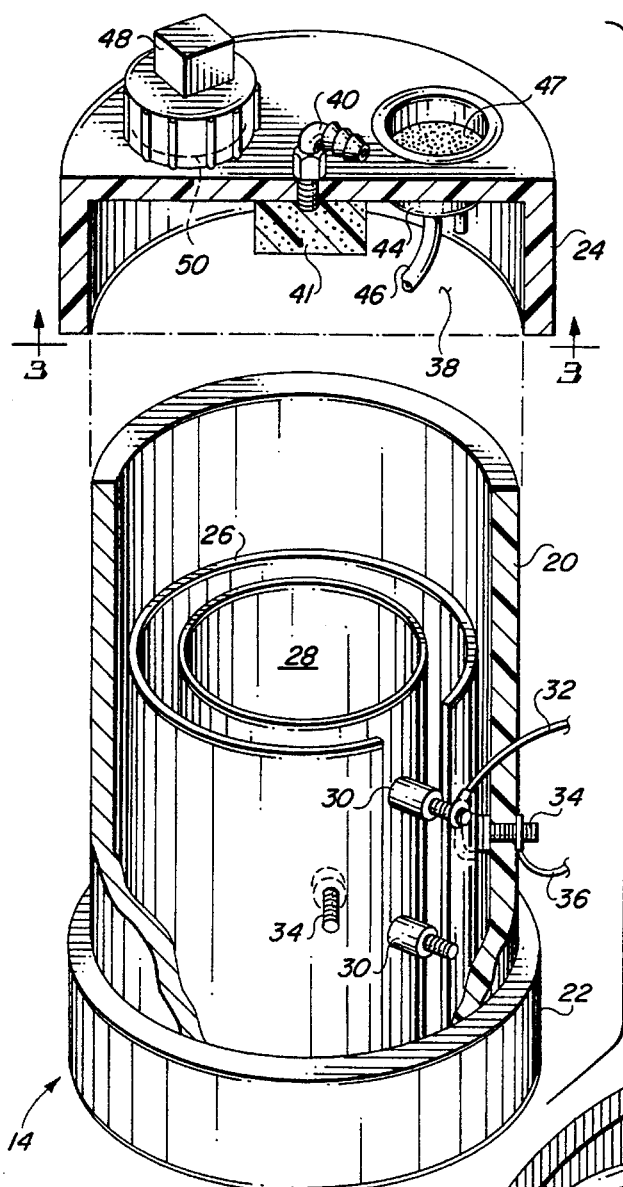
FIG. 2 is an exploded perspective side view of the electrolyte cell of FIG. 1.
Figure 3:
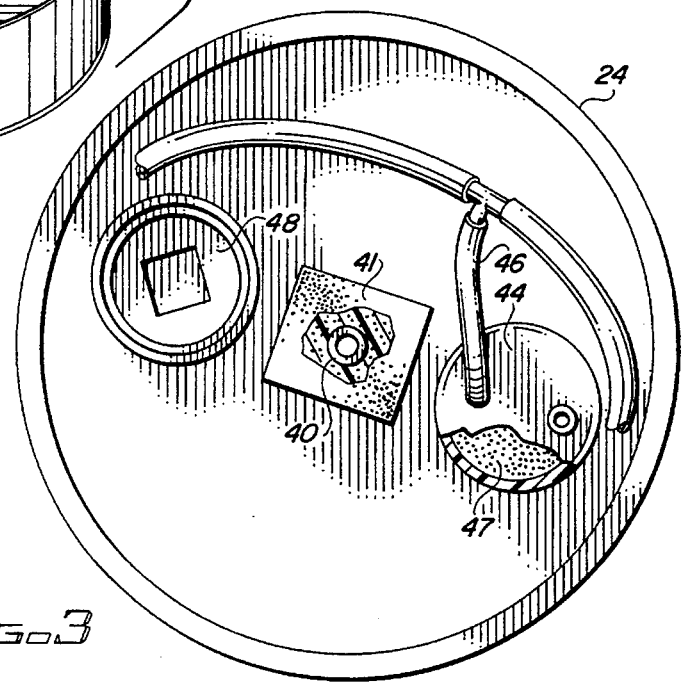
FIG. 3 is a cross sectional view of FIG. 2 taken along the line 3—3.

As shown in FIG. 1, the voltage output from power source 16 is directed through power supply circuit 18. Power supply circuit 18 is designed to optimize the voltage output of source 16 for use with cell 14. In conjunction with an internal combustion engine, power supply circuit 18 (XFMR) steps down the voltage output from about 12 volts/5 amperes to about 3 volts/20 amperes. The stepped down voltage is directed to electrolytic cell 14 which is best seen in FIG. 2. For safety reasons, the stepped down voltage should only reach the cell 14 when the vehicle is running.

Electrolytic cell 14 includes a cylindrical housing 20, a bottom cap 22 and a top cap 24. While the illustrated embodiment shows the cell 14 as cylindrical in shape, of course many other shapes are possible. In the preferred embodiment, bottom cap 22 is permanently secured to housing 20 while top cap 24 is friction fitted. Thus, top cap 24 provides safety in that it will disengage in the event of a pressure buildup in the interior of housing 20.

A cylindrical cathode 26 is secured to the interior surface of housing 20. Cathode 26 is secured to housing 20 by bolts 34 which are electrically connected at one end to cathode 26 and at the other end to negative input 36.

A cylindrical anode 28 is concentrically mounted within cathode 26. Anode 28 is secured to housing 20 by bolts 30 which are electrically insulated from cathode 26 but are electrically connected at one end to anode 28 and at the other end to positive input 32.

The use of a single cathode/anode combination in the present invention saves weight over previous systems. Since the voltage drop due to a single anode/cathode pair is about 2 volts, previous systems would employ as many as six such pairs for maximum efficiency. The present system achieves maximum efficiency with only 1 anode/cathode pair.

The cell 14 contains an electrolytic solution, preferably an aqueous solution of potassium hydroxide as discussed further below. Other possible electrolytes include sodium hydroxide, lithium hydroxide and combinations thereof. The amount of solution contained within the cell 14 is sufficient to completely immerse cathode 26 and anode 28 but does not fill the interior of housing 20. A gas collection zone 38 is created between the surface of the solution and the top of the cell 14.

When current is applied to cathode 26 and anode 28 and passes through the solution, the water in the solution is decomposed into hydrogen and oxygen which accumulates in the zone 38. The hydrogen and oxygen mixture is drawn off through outlet line 40 mounted on top cap 24. A foam splash guard 41 prevents the solution from entering line 40 while permitting the hydrogen and oxygen mixture to pass. The mixture in line 40 mixes with air provided to the engine 12 at an air intake 42. Thus, the hydrogen and oxygen are drawn into the intake manifold of engine 12.

Figure 5:
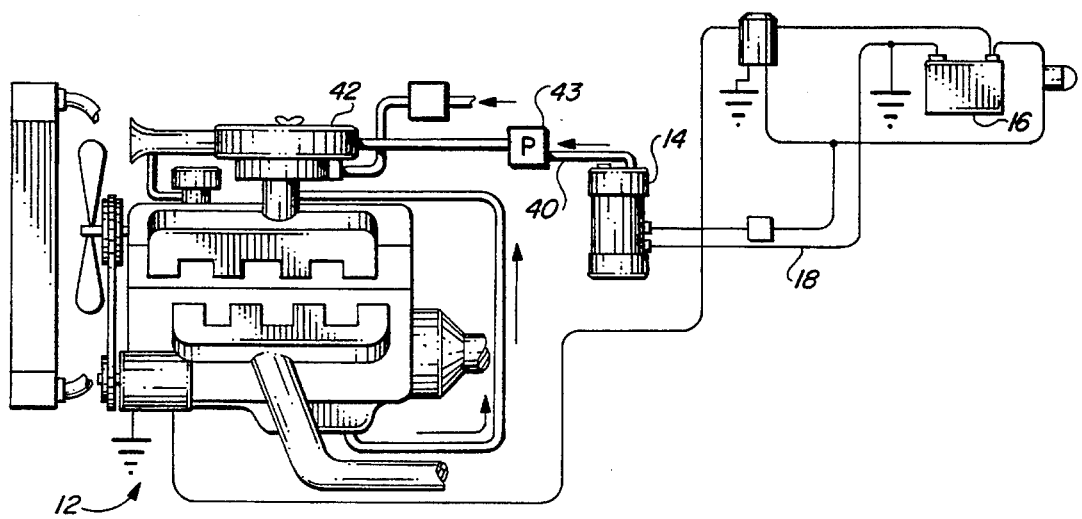
FIG. 5 is a schematic view of an alternate embodiment of the invention.

In the alternate embodiment depicted in FIG. 5, an optional pump 43 is provided between line 40 and the engine 12. Pump 43 will act to pull the hydrogen/oxygen mixture to the intake manifold. It has been found that the pull exerted by crankcase vacuum hose 40 is not consistant. For example, the vacuum drawn is often dependent on the overall condition of the vehicle, specifically, whether the engine is in tune or whether the air filter is clean.

In the preferred embodiment, an air intake valve 44 permits outside air to be drawn into the chamber for mixing with the gases prior to being drawn from the zone 38. In addition, air cooling lines 46 can be provided to extend below the surface of the solution to allow outside air to be drawn through the solution. It has been found that these air bubbles assist in liberating the hydrogen and oxygen gas bubbles from the electrodes. A foam filter element 47 covers the exterior of the above air intake valve 44 and air cooling lines 46 to filter the air before entry. A cap 48 covering opening 50 allow additions of water and electrolyte to be added as needed.

One advantage of the present invention is that the reduced voltage allows the user to employ an aqueous solution having a higher level of electrolyte therein. For example, the preferred electrolyte in the present invention is potassium hydroxide at a concentration of 30–45% by weight in distilled water. In contrast, previous potassium hydroxide systems required concentrations of between 0.05% to 0.1% by weight. Such low concentrations of electrolyte did not provide protection against freezing, thus requiring the user to add antifreeze during the winter months. The higher concentration provides protection against freezing to far lower temperatures than previously provided.

In addition, the percentage of electrolyte in the previous systems was found to be critical to the efficient operation of the cell. However, controlling the concentration at such low levels is difficult. A small error in the amount of electrolyte added to the solution can change the actual concentration drastically.

In contrast, the actual concentration of electrolyte in the present invention has been found to be far less critical to proper operation. Further, the higher levels of electrolyte are easier to control. The reduction in criticality and the increase in control are benefits of the present invention over the previous systems.

Figure 4:
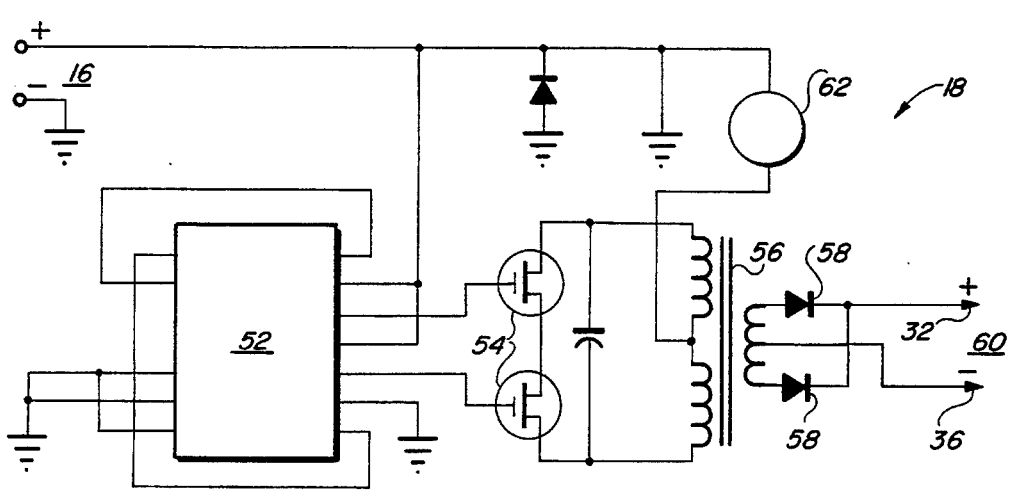
FIG. 4 is a circuit diagram of the power supply in FIG. 1.

Turning now to FIG. 4, the preferred step down power supply circuit 18 comprises the D.C. voltage source 16, preferably an automotive battery or alternator, which provides about 12 volts output, a pulse width modulator 52, two metal oxide semiconductor field effect transistors (MOSFETs) 54, a ferrite transformer 56, two diodes 58 and a voltage output 60. An optional thermal breaker 62 can be provided for safety purposes. The pulse width modulator 52 signals the two MOSFETs 54 (alternatively, two bipolar transistors could be employed) in a push/pull configuration to switch the source current 16 through the ferrite transformer 56. The switching frequency is preferably above the audible range, most preferably but not limited to about 17 KHz.

Preferably, though not necesarily, the ferrite transformer 56 is a bifilar winding wound to achieve about a 4 to 1 voltage reduction with a commensurate 4 to 1 current gain. Thus, when the source 16 is an automotive battery approximately 12 volts at about 5 amperes, the output voltage 60 will be appoximately 3 volts at about 20 amperes. Preferably, though not necessarily, the ferrite transformer 56 output is in a center tap configuration and rectified using two diodes 58 to create a DC output 60 as shown.

Although but two embodiments have been illustrated and described, it will be apparent to those skilled in the art that various changes and modifications may be made therein without departing from the spirit of the invention or from the scope of the appended claims. For example, the preferred operating voltage is about 12 V but alternate embodiments of this invention can operate with a 6 V or 24 V source as will be apparent to those skilled in the art.

That which is claimed:

1. An apparatus for enhancing the combustion of an internal combustion engine, the engine having one or more combustion chambers, the apparatus comprising:

an electrical power source having a voltage output;

an electrolytic cell having a cathode and an anode immersed in an aqueous electrolytic solution, a power supply in electrical communication with the electrical power source and the anode and the cathode, the power supply comprising:

a pulse wave modulator in electrical communication with the power source;

two MOSFETs in electrical communication with the pulse wave modulator, a ferrite transformer in electrical communication with the MOSFETs, the pulse wave modulator signalling the MOSFETs in a push/pull configuration to switch the output to the ferrite transformer, two diodes in electrical communication with the ferrite transformer converting the ferrite transformer output into a D.C. output, the D.C. output being optimal for use with the electrolytic cell, the electrolytic cell breaking down the aqueous solution into a mixture of hydrogen and oxygen gases; and means for conveying the mixture to the combustion chamber of the engine.

2. The apparatus of claim 1 wherein the voltage output of the power source is about 12 volts D.C.

3. The apparatus of claim 2 wherein the power supply is a step down power supply which reduces the voltage output to about 3 volts D.C.

4. The apparatus of claim 1 wherein the aqueous electrolytic solution is 30% to 45% by weight of potassium hydroxide.

5. The apparatus of claim 1 wherein the power source is an alternator.

6. The apparatus of claim 1 wherein the power source is a battery.

7. The apparatus of claim 1 wherein the conveying means comprises an outlet line on the electrolytic cell connected to the combustion chambers of the engine.

8. The apparatus of claim 7 wherein the conveying means further comprises a pump connected to the outlet line directing the mixture to the combustion chamber.

9. The apparatus of claim 1 wherein the MOSFETs switch at a frequency above the audible range.

10. The apparatus of claim 9 wherein the switching frequency is approximately 17 KHz.

11. The apparatus of claim 1 wherein the ferrite transformer is a bifilar winding wound to achieve about a 4 to 1 voltage drop with a commensurate 4 to 1 current gain.

12. The apparatus of claim 11 wherein the ferrite transformer is in a center tap output configuration.

13. The apparatus of claim 12 wherein the output voltage of the electrical power source is about 12 volts at 5 amperes and the D.C. output will be about 3 volts at 20 amperes.

* * * * *